(12) United States Patent
Thiel, III

(10) Patent No.: US 9,949,566 B1
(45) Date of Patent: Apr. 24, 2018

(54) FOLDABLE STOOL

(71) Applicant: Frank William Thiel, III, Sterling Heights, MI (US)

(72) Inventor: Frank William Thiel, III, Sterling Heights, MI (US)

(73) Assignee: Frank William Thiel, III, Sterling Heights, MI (US)

( * ) Notice: Subject to any disclaimer, the term of this patent is extended or adjusted under 35 U.S.C. 154(b) by 0 days.

(21) Appl. No.: 15/641,292

(22) Filed: Jul. 4, 2017

(51) Int. Cl.
| | |
|---|---|
| A47C 3/34 | (2006.01) |
| A47C 4/04 | (2006.01) |
| A47C 4/02 | (2006.01) |
| B62B 5/06 | (2006.01) |

(52) U.S. Cl.
CPC ............ *A47C 3/34* (2013.01); *A47C 4/02* (2013.01); *A47C 4/04* (2013.01); *B62B 5/06* (2013.01)

(58) Field of Classification Search
CPC .... A47C 4/02; A47C 7/70; A47C 4/04; A47C 3/34; B62B 5/06
USPC .............. 297/35, 36, 440.23, 440.1, 440.14, 297/440.22, 440.13
See application file for complete search history.

(56) References Cited

U.S. PATENT DOCUMENTS

| | | | | |
|---|---|---|---|---|
| 5,022,721 A | * | 6/1991 | Melgers | A47B 47/04 108/180 |
| 6,378,712 B1 | * | 4/2002 | Sampl | A47B 47/04 108/107 |
| 6,634,712 B2 | * | 10/2003 | Gamble | A47D 1/004 297/338 |
| 7,784,816 B2 | | 8/2010 | Jian | |
| 8,342,544 B1 | * | 1/2013 | Blewett | B62B 3/022 211/189 |
| 8,479,328 B2 | | 7/2013 | Srour et al. | |
| 8,479,335 B1 | * | 7/2013 | Perry | A47C 16/04 297/423.16 |
| 9,687,080 B1 | * | 6/2017 | Thiel | A47C 9/10 |
| 2012/0222913 A1 | | 9/2012 | Calvert et al. | |

\* cited by examiner

*Primary Examiner* — Milton Nelson, Jr.

(57) ABSTRACT

Adjustable stool are configured to provide comfort and support for an occupant in a plurality of environments, including environments having uneven surfaces, such as a yard. Adjustable stools may include a seat platform and a pair of arms. The seat platform configured to support the occupant may comprise a seating surface and a plurality of pins. The plurality of pins may be affixed to corners of the seat platform and extend away from the seat platform. The pair of arms may define a slotted portion, with the slotted portion comprising a plurality of endpoints. The slotted portion may be configured to be engaged by each of the plurality of pins that extend away from the seat platform. Each of the plurality of pins may be configured to be reversibly held at each of the plurality of endpoints, with each of the plurality of endpoints defining a height of the adjustable stool. The plurality of endpoints may comprise a pattern.

15 Claims, 7 Drawing Sheets

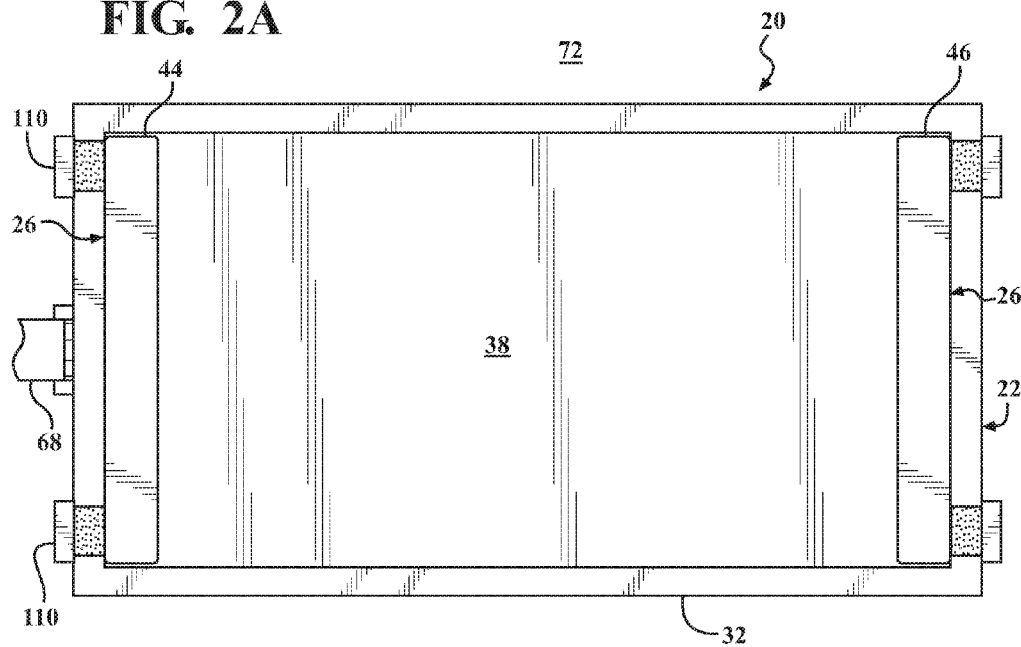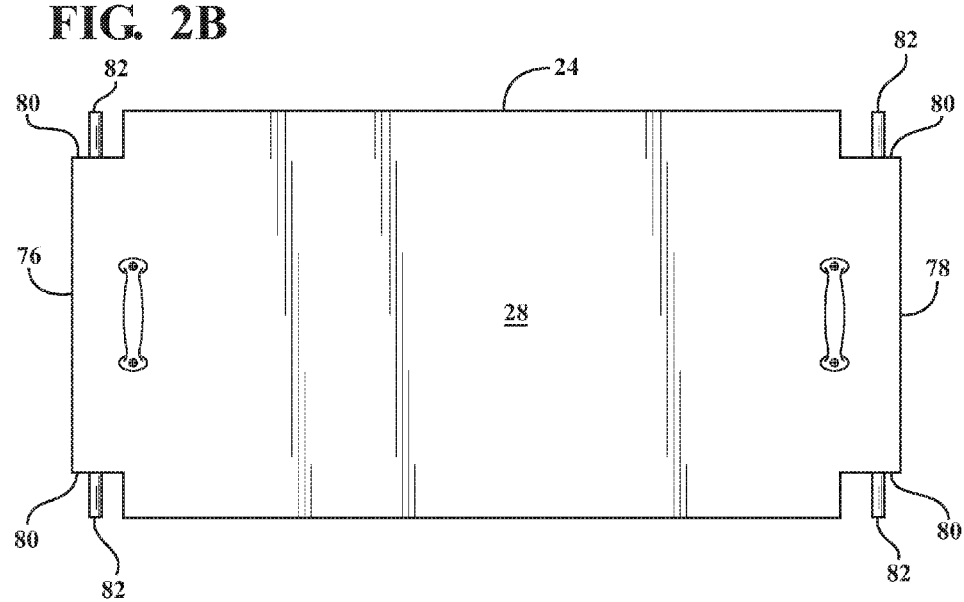

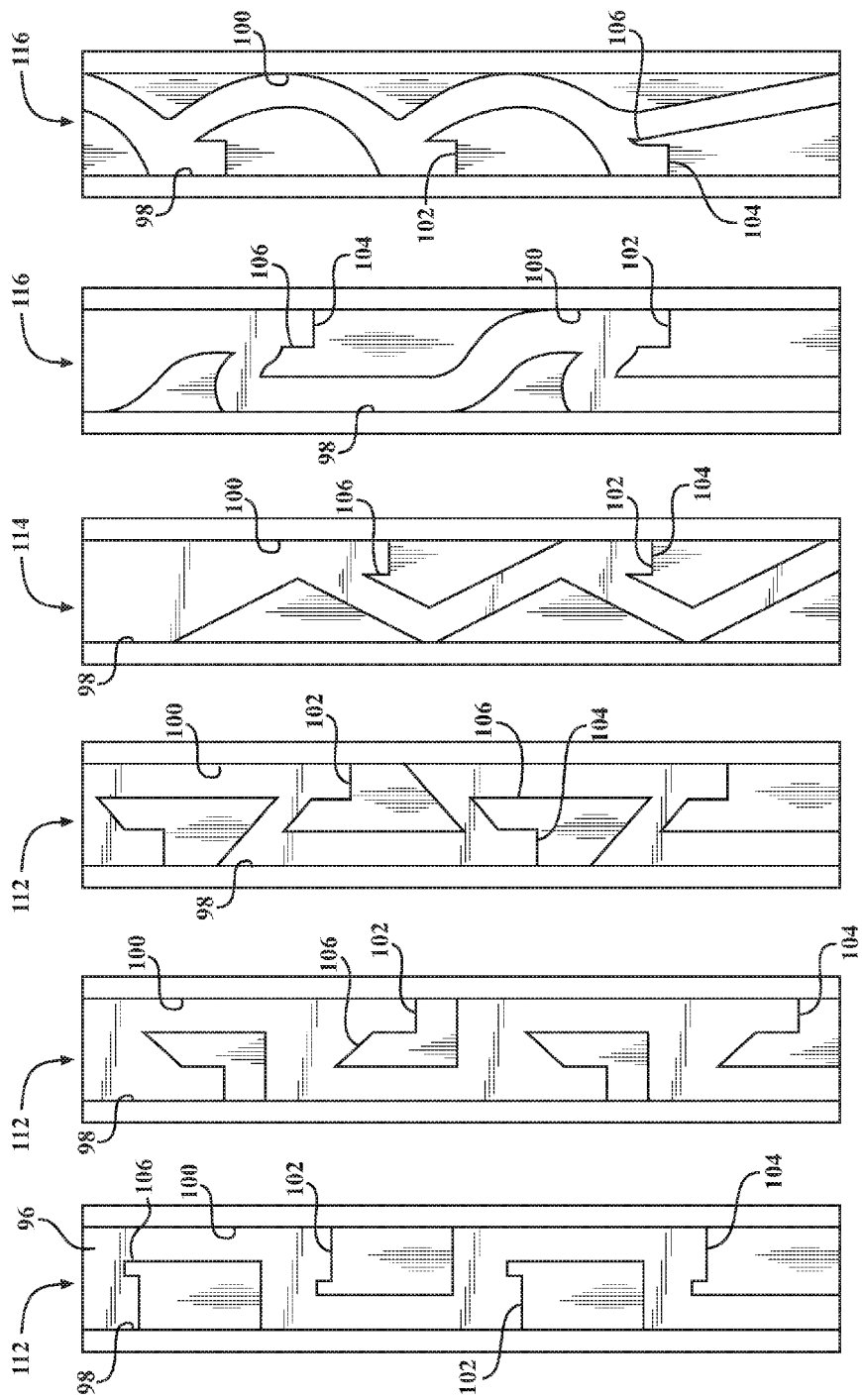

FOLDABLE STOOL

CROSS-REFERENCE TO RELATED APPLICATIONS

This application claims the benefit of U.S. Pat. No. 9,687,080, filed Apr. 29, 2016, the entireties of which are hereby incorporated herein by reference for all purposes.

TECHNICAL FIELD

The present invention generally relates to chairs, and more particularly, to adjustable stools.

BACKGROUND

The background description provided herein is for the purpose of generally presenting the context of the disclosure. Work of the presently named inventor, to the extent it may be described in this background section, as well as aspects of the description that may not otherwise qualify as prior art at the time of filing, are neither expressly nor impliedly admitted as prior art against the present technology.

Chairs may secure an occupant in a seated position. More specifically, chairs may provide a surface the occupant may engage and sit on when the occupant desires to remain in a fixed position. Stools, a type of chair, commonly include a seat bottom and a pair of arms, with the seat bottom configured to contain the occupant in the seated position. While the stool is well suited to provide comfort and support for the occupant in the fixed position, it would be advantageous to provide a stool that satisfies additional requirements. For example, the occupant may desire mobility such that the stool may be used in a plurality of environments. Further, the occupant may desire the stool to provide comfort and support when used in environments having uneven surfaces, such as a yard or inside a home.

SUMMARY

This section provides a general summary of the disclosure, and is not a comprehensive disclosure of its full scope or all of its features.

In various aspects, the present teachings provide a foldable stool. The foldable stool includes a base, a seat platform and a pair of arms. The seat platform is configured to support an occupant. The seat platform includes a plurality of pins. Each of the plurality of pins extends away from the seat platform along a plane parallel to the seat platform. At least one pin is located at each end of the seat platform. The pair of arms is coupled to the base. Each of the pair of arms defines a slotted portion. The slotted portion includes a plurality of endpoints. Each of the plurality of pins is configured to engage the slotted portion and be reversibly held at one of the plurality of endpoints. The pair of arms may occupy a generally C-shaped configuration, with the pair of arms hingedly attached to the base at a first end and a second end. The pair of arms may be moveable between a first position and a second position. Each of the pair of arms may extend away from the base and may be configured to support the occupant in the first position. Each of the pair of arms may be generally parallel to the base in the second position. The slotted portion of the pair of arms may be engaged by the plurality of pins when each of the pair of arms is in the first position. The pair of arms may include a first arm and a second arm, with the first arm configured to fold on top of the second arm when the pair of arms engage the second position. The pair of arms and the seat platform may be stored within the base when the pair of arms are in the second position. The seat platform may move between the plurality of endpoints in the slotted portion when the pair of arms are in the first position. The seat platform may reversibly occupy a plurality of fixed heights.

In other aspects, the present teachings provide a foldable stool. The foldable stool includes a base, a seat platform, a seating portion and a pair of arms. The seat platform is configured to reversibly occupy a plurality of fixed heights. The seat platform includes a plurality of pins. Each of the plurality of pins extends away from the seat platform along a plane parallel to the seat platform. At least one pin is located at each end of the seat platform. The seating portion is configured to support an occupant. The pair of arms is coupled to the base. Each of the pair of arms defines a slotted portion, with the slotted portion comprising a plurality of endpoints. The pair of arms are moveable between a first position and a second position. Each of the plurality of pins of the seat platform is configured to engage the slotted portion and be reversibly held at one of the plurality of endpoints when the pair of arms are in the first position. The pair of arms may occupy a generally C-shaped configuration, with the pair of arms hingedly attached to the base at a first end and a second end. Each of the pair of arms may extend away from the base and may support the occupant in the first position. Each of the pair of arms may be generally parallel to the base in the second position. The pair of arms may include a first arm and a second arm. The first arm may fold on top of the second arm when the pair of arms engage the second position. The pair of arms and the seat platform may be stored within the base when the pair of arms are in the second position.

In still other aspects, the present teachings provide a foldable stool. The foldable stool includes a base, a seat platform, a pair of arms, and a slotted portion. The seat platform is configured to support an occupant. The seat platform includes a plurality of pins. Each of the plurality of pins extends away from the seat platform along a plane parallel to the seat platform. At least one pin is located at each end of the seat platform. The pair of arms are moveable between a first position and a second position. The pair of arms are coupled to the base. The slotted portion is configured to be engaged by each of the plurality of pins. The slotted portion includes a first side, a second side and a plurality of endpoints. Each of the plurality of endpoints is affixed to the first side and the second side of the slotted portion in a pattern. Each of the plurality of pins configured to be reversibly held at each of the plurality of endpoints. The pattern of the plurality of endpoints may be an alternating pattern, with at least one of the plurality of endpoints affixed to the first side of the slotted portion, and at least one of the plurality of endpoints affixed to the second side of the slotted portion. The pattern of the plurality of endpoints may be a first side pattern, wherein the plurality of endpoints are affixed to the first side of the slotted portion. The pattern of the plurality of endpoints may be a second side pattern, wherein the plurality of endpoints are affixed to the second side of the slotted portion. The pair of arms may occupy a generally C-shaped configuration, with the pair of arms hingedly attached to the base at a first end and a second end. Each of the pair of arms may extend away from the base and may support the occupant in the first position. Each of the pair of arms may be generally parallel to the base in the second position. The slotted portion may be engaged by the plurality of pins of the seat platform when each of the pair of arms is in the first position.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein:

FIG. 2A is a top view of the foldable stool comprising the base and the pair of arms, with the pair of arms in the first position;

FIG. 2B is a top view of the seat platform;

FIG. 7A is a side view of the slotted portion of the pair of arms, wherein a pattern of the plurality of endpoints is a first alternating pattern;

FIG. 7B is a side view of the slotted portion of the pair of arms, wherein the pattern of the plurality of endpoints is a second alternating pattern;

FIG. 7C is a side view of the slotted portion of the pair of arms, wherein the pattern of the plurality of endpoints is a third alternating pattern;

FIG. 7D is a side view of the slotted portion of the pair of arms, wherein the pattern of the plurality of endpoints is a first first side pattern;

FIG. 7E is a side view of the slotted portion of the pair of arms, wherein the pattern of the plurality of endpoints is a second first side pattern;

FIG. 7F is a side view of the slotted portion of the pair of arms, wherein the pattern of the plurality of endpoints is a second side pattern.

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present technology generally provides an adjustable stool. The adjustable stool is configured to provide comfort and support for an occupant in a plurality of environments, including environments having uneven surfaces, such as a yard or a home. The adjustable stool includes a seat platform and a pair of arms. The seat platform is configured to support the occupant. The pair of arms define a slotted portion, with the slotted portion comprising a plurality of endpoints. The slotted portion is configured to be engaged by each of a plurality of pins that are affixed to and extend away from the seat platform. Each of the plurality of pins is configured to be reversibly held at each of the plurality of endpoints. The plurality of endpoints may comprise a pattern.

Figure 1:
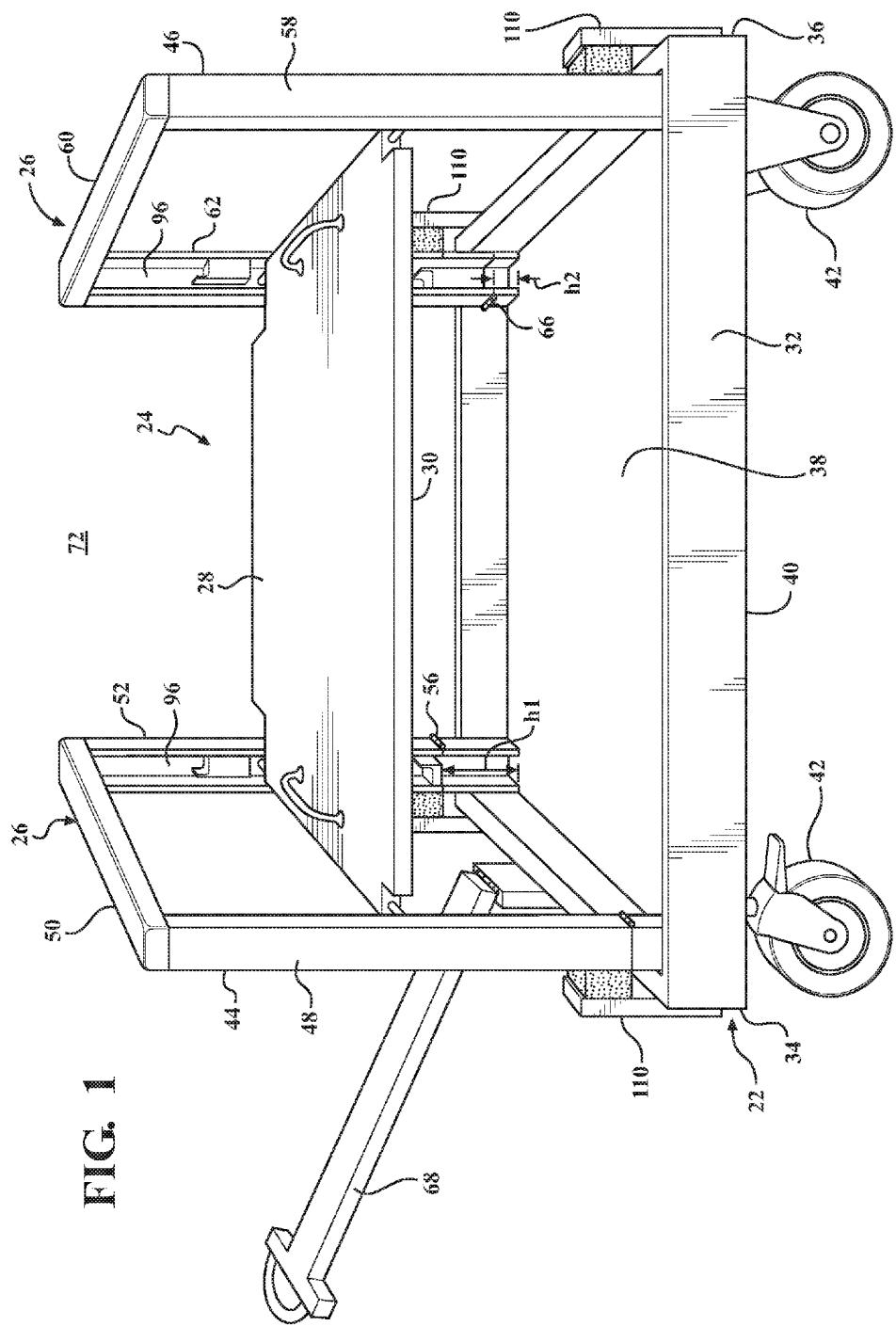
FIG. 1 is a perspective view of a foldable stool comprising a base, a seat platform, and a pair of arms, with the pair of arms in a first position.

Referring to FIG. 1, an exemplary foldable stool 20 according to various aspects of the present technology may include features to provide comfort and support for the occupant. In one or more arrangements, the foldable stool 20 may include a base 22, a seat platform 24, and a pair of arms 26. The seat platform 24, configured to support a load or force applied by the occupant, may include a seating portion 28 for engaging structures such as but not limited to a lower torso or lower extremities of the occupant. A lower surface 30 of the seat platform 24 may be opposite the seating portion 28, with the lower surface 30 proximate the base 22 of the foldable stool 20. The base 22 may include a frame 32 for supporting the foldable stool 20. The frame 32 may include a first end 34 and an opposite second end 36. An upper surface 38 of the frame 32 may be opposite a lower surface 40, with the lower surface 40 proximate a floor (such as but not limited to a ground or a yard). A plurality of casters 42 may be affixed to the lower surface 40 of the frame 32. For exemplary purposes only, one caster of the plurality of casters 42 may be affixed to a corner of the lower surface 40 of the frame 32. Further, the plurality of casters 42 may be lockable, thereby allowing the foldable stool 20 to remain in a fixed position when the plurality of casters 42 are locked.

In one or more arrangements, the pair of arms 26 may include a first arm 44 and a second arm 46, with the first arm 44 hingedly secured to the frame 32 proximate the first end 34, and the second arm 46 hingedly secured to the frame 32 proximate the second end 36. The pair of arms 26 define a generally C-shaped configuration. Each of the first arm 44 and the second arm 46 have an equivalent height h. The height h may be any height shorter than a length 1 of the frame 32. The first arm 44 may include a first portion 48, a middle portion 50, and a second portion 52. The middle portion 50 connects therebetween the first portion 48 and the second portion 52, with the first portion 48 connecting at an opposite end of the middle portion 50 than the second portion 52. Both of the first portion 48 and the second portion 52 are connected to the frame 32. The first portion 48 may include a first hinge 54, and the second portion 52 may include a second hinge 56. The second arm 46 may include a first portion 58, a middle portion 60, and a second portion 62. The middle portion 60 connects therebetween the first portion 58 and the second portion 62, with the first portion 58 connecting at an opposite end of the middle portion 60 than the second portion 62. Both of the first portion 58 and the second portion 62 are connected to the frame 32. The first portion 58 may include a first hinge 64, and the second portion 62 may include a second hinge 66. The middle portion 50, 60 is configured to make a direct contact with hands of the occupant, and support the occupant who is seated, rising, or descending onto the foldable stool 20. As will be discussed in detail, each of the plurality of hinges 54,56,64,66 may be located proximate the frame 32. Additionally, a pull arm 68 may be attached to either of a first end 34 or a second end 36 of the frame 32.

In one or more arrangements, the frame 32 may define a space 70. FIG. 2A is a top view of the foldable stool 20 wherein the seat platform 24 has been removed. The foldable stool 20 may occupy either of a first position 72 or a second position 74. The space 70 is configured to contain the seat platform 24, the pair of arms 26 and the pull arm 68 when the pair of arms 26 are in the second position 74. When the pair of arms 26 are in the first position 72, as shown in FIG. 1 and FIG. 2A, the pair of arms 26 may support a force including but not limited to a seated force, a rising force, or a descending force, exerted by the occupant. In the first position 72, each of the first arm 44 and the second arm 46 of the pair of arms 26 may extend away from the base 22, such that the first arm 44 and second arm 46 are generally perpendicular to the base 22. The pair of arms 26 in the first position 72 define a use position for the foldable stool 20.

In one or more arrangements, the foldable stool 20 may include the seat platform 24. FIG. 2B is a top view of the seat platform 24. The seat platform 24 may include the seating portion 28 whereby the lower torso or lower extremities of the occupant engages the foldable stool 20. The seating portion 28 may comprise a foam layer and a textured layer as to provide comfort and stability to the occupant who may be seated, rising, descending, or kneeling. The seat platform 24 may further include a first end 76 and an opposite second end 78. Both the first end 76 and the second end 78 of the seat platform 24 may include a plurality of corners 80. A pin 82 may extend away from each of the plurality of corners 80, with each of the plurality of pins 82 extending away from the respective corner 80 to which they are affixed along a plane parallel to the seat platform 24. Further, each of the plurality of pins 82 are parallel to one another. Each of the plurality of pins 82 may be fixedly attached to each respective corner 80. Alternatively, each of the plurality of pins 82 may be reversibly attached to each respective corner 80.

Figure 3:
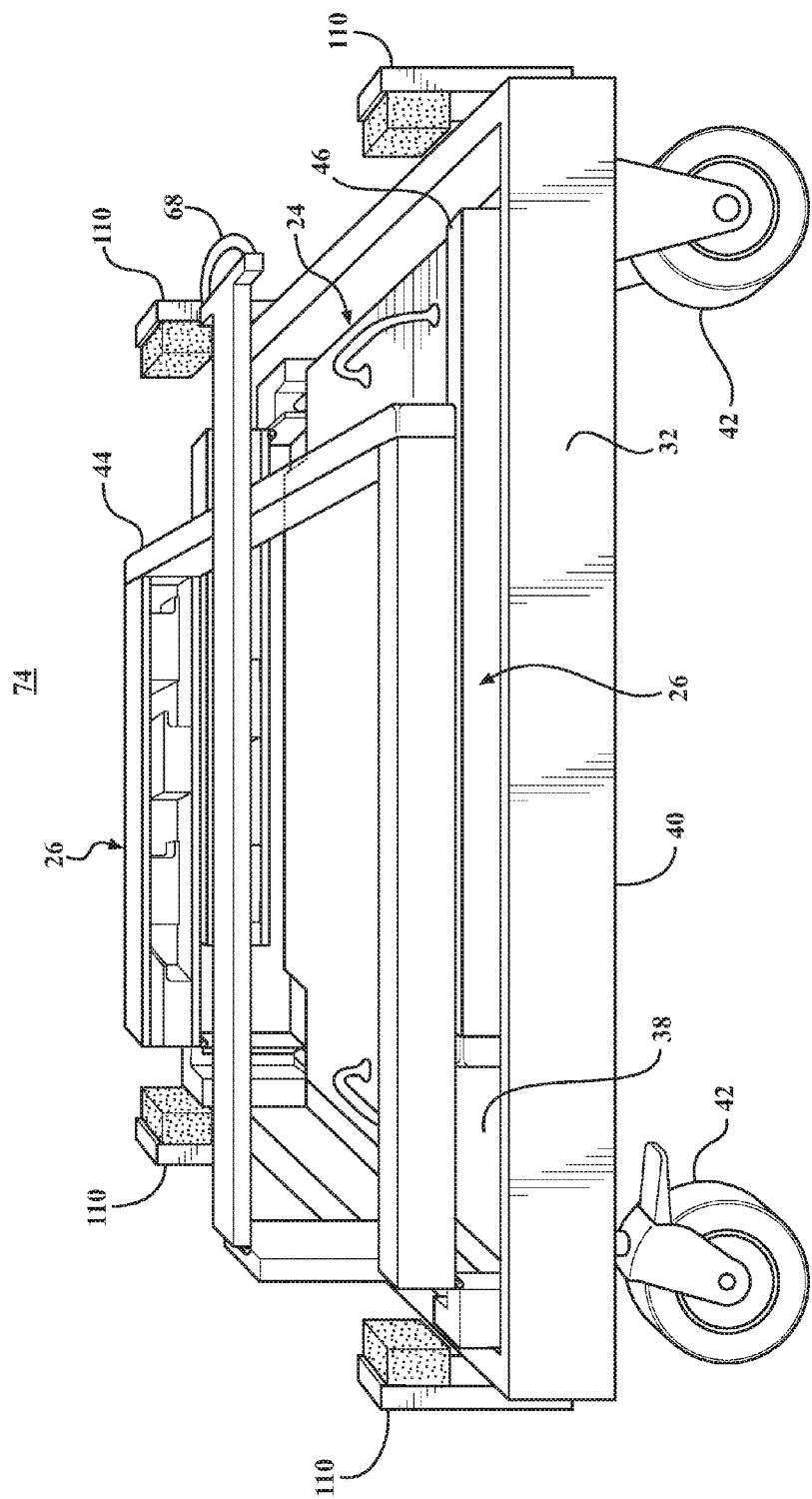
FIG. 3 is a perspective view of the foldable stool, with the pair of arms in a second position.

In one or more arrangements, the pair of arms 26 of the foldable stool 20 may occupy the second position 74. FIG. 3 is a perspective view of the foldable stool 20 with the pair of arms 26 in the second position 74. In the second position 74, each of the first arm 44 and the second arm 46 of the pair of arms 26 may be in contact with and overlapping one another, such that the first arm 44 and second arm 46 are generally parallel to the base 22. In the second position 74, the second arm 46 may be folded on top of the first arm 44, and the first arm 44 may be folded on top of the upper surface 38 of the frame 32. Further, the pull arm 68 may be folded overlapping the second arm 46 in the second position 74. The pair of arms 26 in the second position 74 define a storage position for the foldable stool 20.

Figure 4:
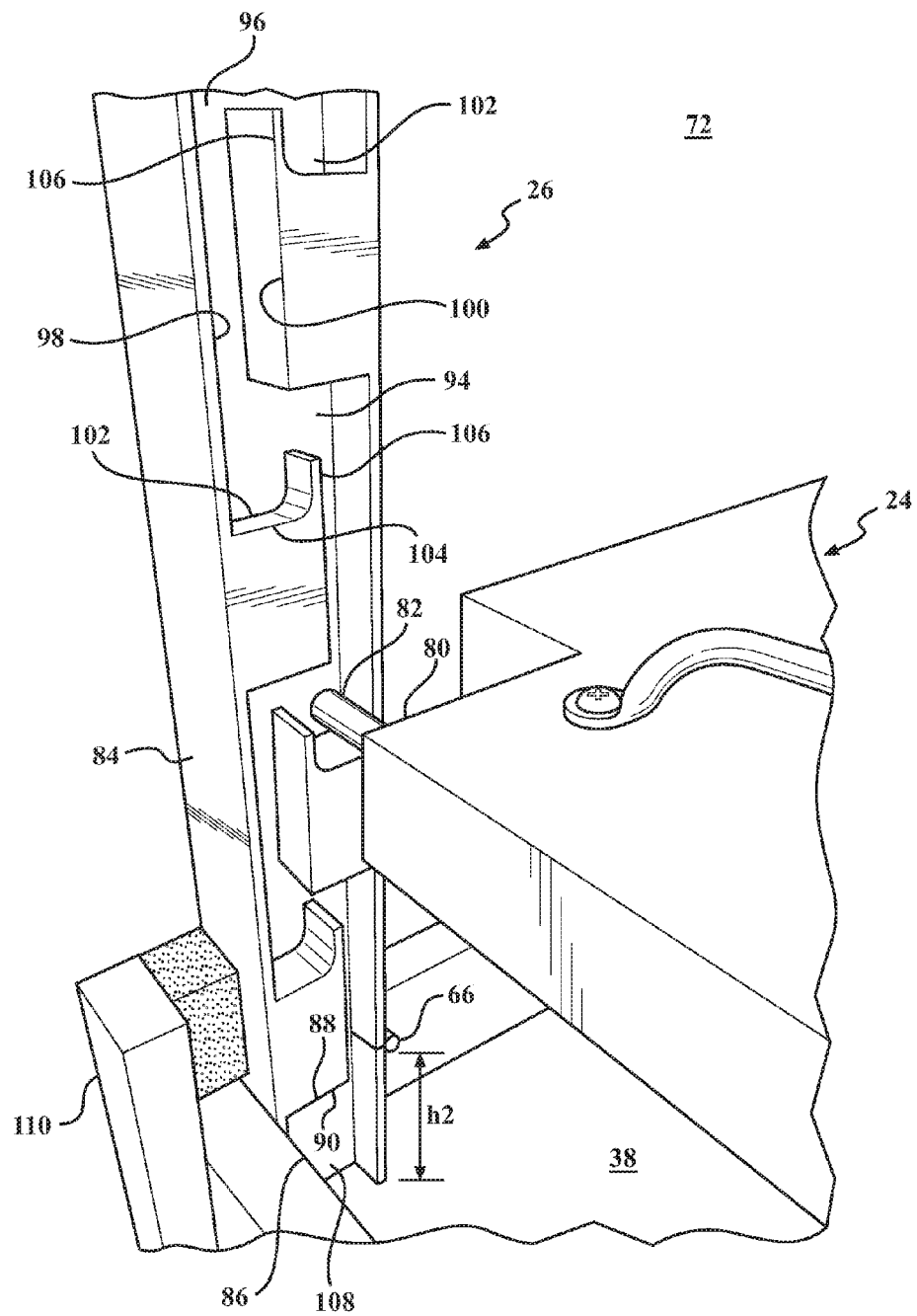
FIG. 4 is a perspective view of a slotted portion comprising a plurality of endpoints, with the pair of arms in the first position.

In one or more arrangements, the pair of arms 26 may occupy the first position 72. FIG. 4 is a perspective view of one of the first portions 48, 58 or second portions 52, 62 of the pair of arms 26 in the first position 72. For exemplary purposes only, FIG. 4 is a perspective view of the second portion 62 of the second arm 46 of the pair of arms 26. Each of the first portion 48, 58 and second portion 52, 62 include the components described herein. The second portion 62 includes an upper portion 84 and a lower portion 86. The hinge 66 connects therebetween the upper portion 84 and the lower portion 86. In the first position 72, a first end 88 of the upper portion 84 makes a flush contact with a second end 90 of the lower portion 86. In the second position 74, the first end 88 of the upper portion 84 makes an edgewise contact with the second end 90 of the lower portion 86.

In one or more arrangements, as shown in FIGS. 1 and 4, each lower portion 86 of the first portion 48 and second portion 52 of the first arm 44 has a height h1. Additionally, each lower portion 86 of the first portion 58 and second portion 62 of the second arm 46 has a height h2. Height h1 is taller than a height h2. Further, each upper portion 84 of the first portion 48 and second portion 52 of the first arm 44 has a height h3. Each upper portion 84 of the first portion 58 and second portion 62 of the second arm 46 has a height h4. Height h3 is shorter than height h4. The height h1 plus h3 is equivalent to the height h2 plus h4. As shown in FIG. 3, in the second position 74, the first arm 44 is folded on top of the second arm 46. The second position 74 is facilitated by the height relationship of h1 being taller than h2 and h3 being shorter than h4. In the second position 74, the height h2 of the lower portion 86 of the second arm 46 is such that the second arm 46 lays securely on and generally parallel to the upper surface 38 of the frame 32. Further, in the second position, the height h1 of the lower portion 86 of the first arm 44 is such that the first arm 44 lays securely on and generally parallel to the second arm 46. Both the first arm 44 and the second arm 46 fit securely within the space 70 in the frame 32 when the pair of arms 26 are in the second position 74.

In one or more arrangements, as shown in FIG. 4, each of the first portion 48, 58 and second portion 52, 62 of the pair of arms 26 define a slotted portion 94. The slotted portion 94 comprises a channel 96 having a first side 98, an opposite second side 100, and a plurality of endpoints 102. For exemplary purposes only, the slotted portion 94 comprises at least one endpoint 102. As shown in FIG. 4, the slotted portion 94 is configured to engage the pins 82 affixed to the seat platform 24 when the pair of arms 26 are in the first position 72. Each of the plurality of endpoints 102 comprises a first surface 104 bounded at one end by a stop member 106 and bounded at the other opposite end by either of the first side 98 or the second side 100 of the channel 96. The channel 96 runs the entire length of the first portion 48, 58 and the second portion 52, 62, through both the upper portion 84 and the lower portion 86. The plurality of endpoints 102 are located exclusively along the length of the upper portion 84 of the first portion 48, 58 and second portion 52, 62 of the pair of arms 26. Each of the plurality of pins 82 are configured to move throughout the entire length of the channel 96 and engage any of the plurality of endpoints 102.

In one or more arrangements, the stop member 106 is configured to retain each one of the plurality of pins 82 proximate one of the plurality of endpoint 102. More specifically, the stop member 106 and the either of the first side 98 or the second side 100 of the channel 96 associated with one of the plurality of endpoints 102 secures one of the plurality of pins 82 at each one of the plurality of endpoints 102. In order to move the seat platform 24 from one of the plurality of endpoints 102 (one height) to another of the plurality of endpoints 102 (another height), each of the plurality of pins 82 must be disengaged from the plurality of endpoints 102 (at the one height) and engaged in other of the plurality of endpoints 102 (at another height). Further, the movement of the seat platform 24 from one height to another height requires each of the plurality of pins 82 to be disengaged from the stop member 106 associated with the endpoint 102.

Figure 5:
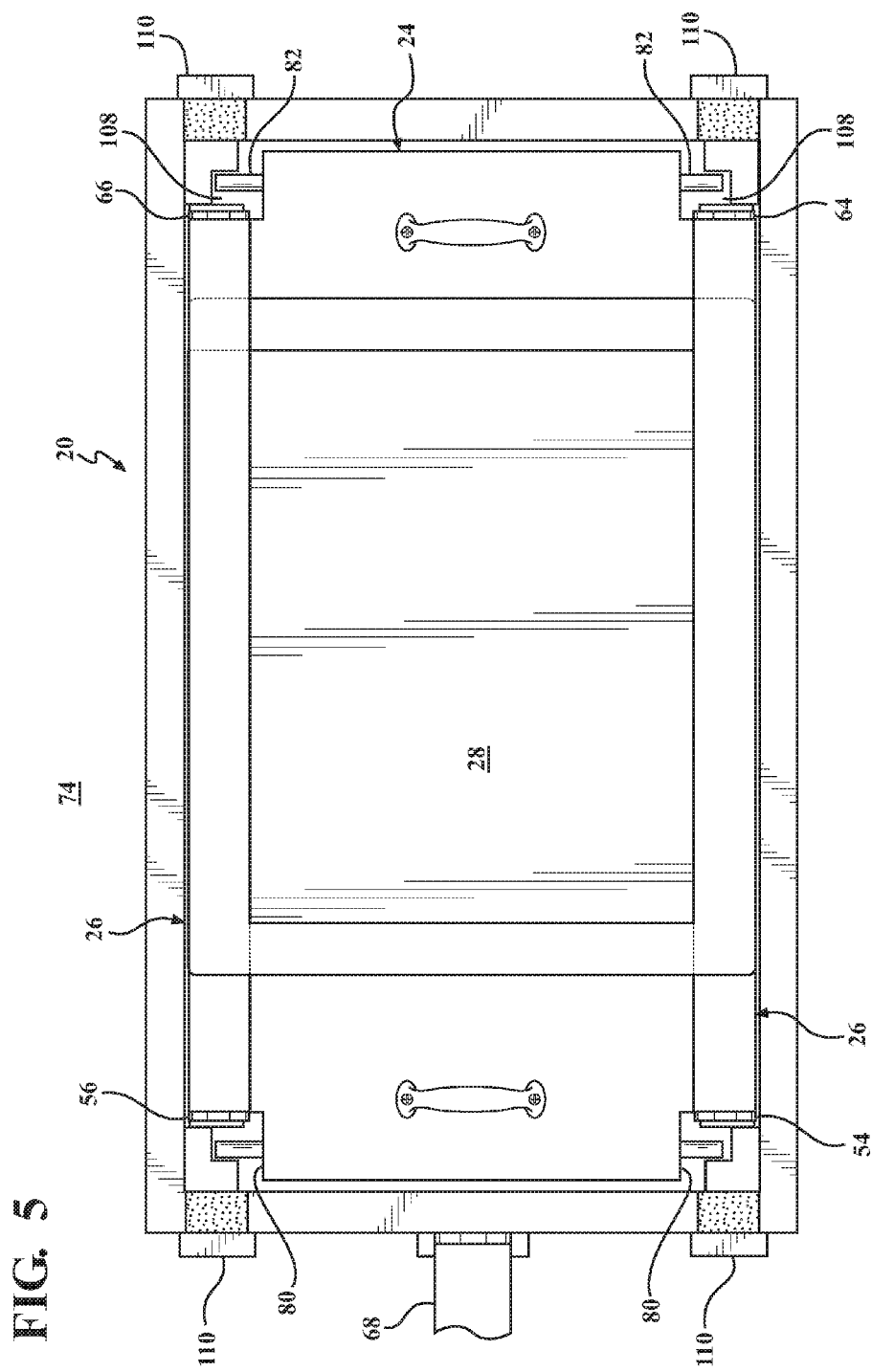
FIG. 5 is top view of the foldable stool, with the pair of arms in the second position.

In one or more arrangements, the channel 96 runs through the lower portion 86 of the first portion 48, 58 and second portion 52, 62. As shown in FIG. 5, the channel 96 terminates in a recess 108. The recess 108 is configured to secure the seat platform 24 when the pair of arms 26 are in the second position 74. More specifically, each of the plurality of pins 82 affixed to each corner 80 of the seat platform 24 is configured to engage the recess 108 in the channel 96 when the pair of arms 26 are in the second position 74. The recess 108 is engaged by the plurality of pins 82 of the seat platform 24 when the foldable stool 20 is the storage position. Additionally, the recess 108 may be engaged by the plurality of pins 82 of the seat platform 24 when the pair of arms 26 are in the first position 72.

Figure 6:
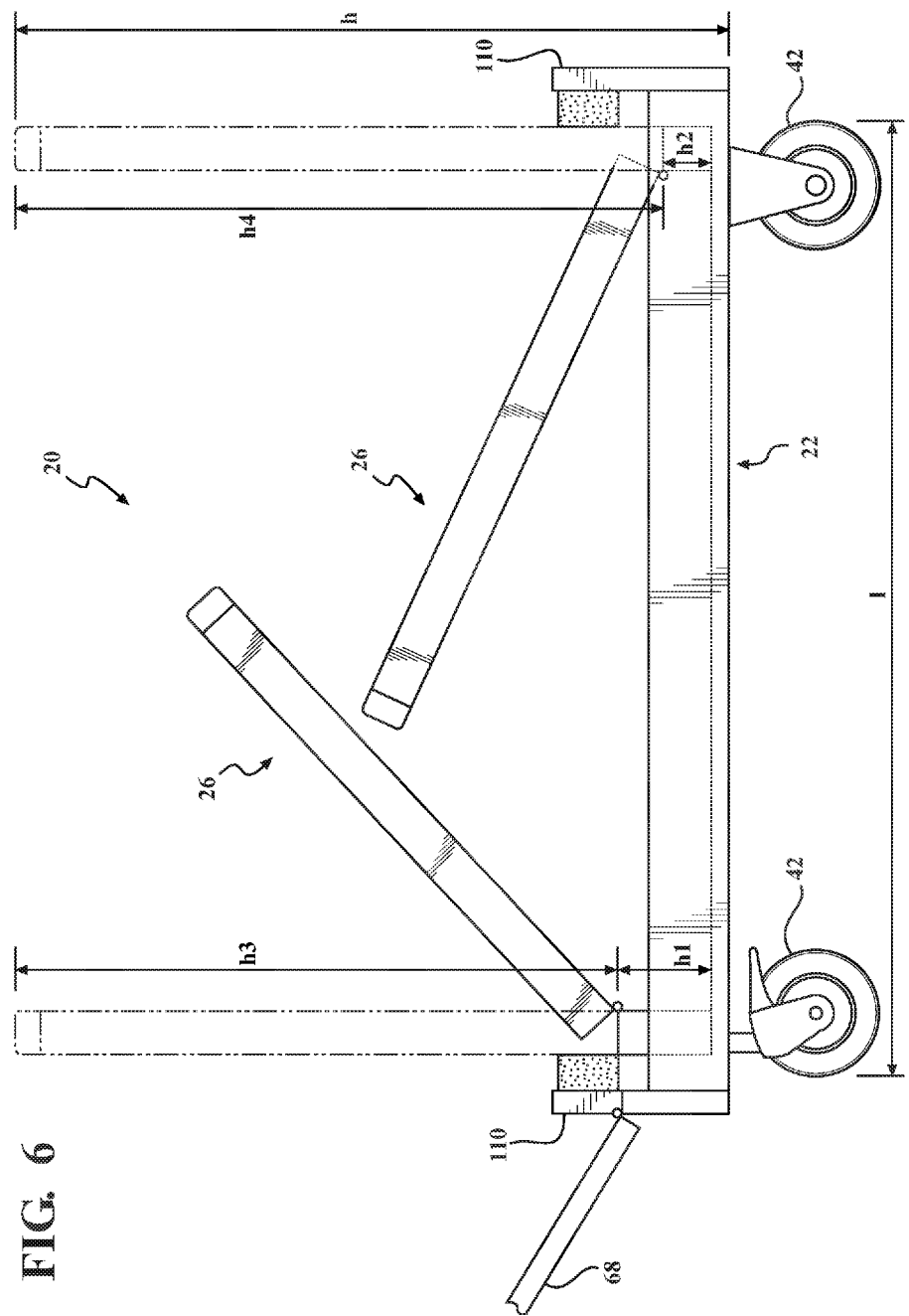
FIG. 6 is a perspective view of the pair of arms moving between the first position and the second position.

In one or more arrangements, the pair of arms 26 are configured to move between the first position 72 and the second position 74. Therefore, the foldable stool 20 may be readily moved between the use position and the storage position. As shown in FIG. 6, the first hinge 54,64 and the second hinge 56,66 facilitate the movement of the pair of arms 26. When the first hinge 54,64 and the second hinge 56,66 occupy a straight orientation (as observed when the pair of arms 26 are in the first position 72), the foldable stool 20 occupies the use position. When the first hinge 54,64 and the second hinge 56,66 occupy a perpendicular orientation (as observed when the pair of arms 26 are in the second position 74), the foldable stool occupies the storage position. As the first hinge 54,64 and the second hinge 56,66 are moved between the straight orientation and the perpendicular orientation, the pair of arms 26 move between the first position 72 and the second position 74. The pair of arms 26 are held in the second position 74 by the force of gravity. Additionally, a clamp or locking mechanism may facilitate securing the pair of arms 26 in the second position 74. The pair of arms 26 are held in the first position 72 by one of a plurality of stop members 110. Stop members 110 are affixed to each corner of the frame 32, and ensure that the pair of arms 26 do not move beyond an orientation generally perpendicular to the frame 32 when the pair of arms 26 engage the first position 72.

In one or more arrangements, the seat platform 24 is configured to reversibly occupy a plurality of fixed heights. The maximal height of the seat platform 24 is a height lower than height h. As shown in FIG. 7A, the seat platform 25 may be reversibly held at one of the plurality of endpoints 102, with each of the plurality of endpoints 102 in the channel 96 defining a different height. More specifically, each of the plurality of pins 82 affixed to each corner 80 of the seat platform 24 is configured to engage the endpoints 102 in the channel 96 when the pair of arms 26 are in the first position 72. The seat platform 24 is thereby operable to occupy the plurality of fixed heights, with the seat platform 24 configured to move between the plurality of endpoints 102 in the slotted portion 94 when the pair of arms 26 are in the first position 72. Further, the seat platform 25 may reversibly engage any combination of the plurality of endpoints 102 such that the seat platform 24 remains generally parallel to the base 22 of the foldable stool 20.

In one or more arrangements, the plurality of endpoints 102 are configured to occupy a pattern. As shown in FIGS. 7A-7F, the plurality of endpoints 102 may occupy an alternating pattern 112 (FIGS. 7A-7C), a first side pattern 114 (FIGS. 7D-7E), or a second side pattern 116 (FIG. 7F). The patterns of the plurality of endpoints 102 described herein are not limiting, and may include additional patterns.

In one or more arrangements, as shown in FIGS. 7A-7C, the alternating pattern 112 comprises at least one of the plurality of endpoints 102 affixed to the first side 98 of the channel 96, and at least one of the plurality of endpoints 102 affixed to the second side 100 of the channel 96, with a first of the plurality of endpoints 102 affixed to the first side 98 of the channel 96, followed by a second of the plurality of endpoints 102 affixed to the second side 100 of the channel 96. The alternating pattern 112 may be repeated through the entire length of the channel 96.

In one or more arrangements, as shown in FIGS. 7D-7E, the first side pattern 114 comprises the plurality of endpoints 102 affixed to the first side 98 of the channel 96, with a first of the plurality of endpoints 102 affixed to the first side 98 of the channel 96, followed by a second of the plurality of endpoints 102 affixed to the first side 98 of the channel 96. The first side pattern 114 may be repeated through the entire length of the channel 96.

In one or more arrangements, as shown in FIG. 7F, the second side pattern 116 comprises the plurality of endpoints 102 affixed to the second side 100 of the channel 96, with a first of the plurality of endpoints 102 affixed to the second side 100 of the channel 96, followed by a second of the plurality of endpoints 102 affixed to the second side 100 of the channel 96. The second side pattern 116 may be repeated through the entire length of the channel 96.

Aspects herein can be embodied in other forms without departing from the spirit or essential attributes thereof. Accordingly, reference should be made to the following claims, rather than to the foregoing specification, as indicating the scope of the invention.

The foregoing description is provided for purposes of illustration and description and is in no way intended to limit the disclosure, its application, or uses. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range, including the endpoints.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

What is claimed is:

1. A foldable stool, comprising:
    a base;
    a seat platform configured to support an occupant, the seat platform comprising a plurality of pins, each of the plurality of pins extending away from the seat platform along a plane parallel to the seat platform, with at least one pin located at each end of the seat platform; and
    a pair of arms defining a generally C-shaped configuration, hingedly attached to the base at a first end and a second end, each of the pair of arms defining a slotted portion, with the slotted portion comprising a channel and a plurality of endpoints, wherein the channel runs the entire length of the pair of arms and each of the plurality of pins of the seat platform is configured to engage the slotted portion, being reversibly held at one of the plurality of endpoints, and move throughout the entire length of the channel, wherein the pair of arms and the seat platform are configured to be stored within the base when the pair of arms are in a second position.

2. The foldable stool of claim 1, wherein the pair of arms are moveable between a first position and second position.

3. The foldable stool of claim 2, wherein the pair of arms comprises a first arm and a second arm, with the first arm configured to fold on top of the second arm when the pair of arms engage the second position.

4. The foldable stool of claim 2, wherein each of the pair of arms extends away from the base and is configured to support the occupant in the first position, and each of the pair of arms is generally parallel to the base in the second position.

5. The foldable stool of claim 2, wherein the slotted portion of the pair of arms is configured to be engaged by the plurality of pins of the seat platform when each of the pair of arms is in the first position.

6. The foldable stool of claim 5, wherein the seat platform is configured to move between the plurality of endpoints in the slotted portion when the pair of arms are in the first position, with the seat platform configured to reversibly occupy a plurality of fixed heights.

7. A foldable stool, comprising:
    a base;
    a seat platform configured to reversibly occupy a plurality of fixed heights, the seat platform comprising a plurality of pins, each of the plurality of pins extending away from the seat platform along a plane parallel to the seat platform, with at least one pin located at each end of the seat platform;
    a seating portion configured to support an occupant; and
    a pair of arms defining a generally C-shaped configuration, hingedly attached to the base at a first end and a second end, each of the pair of arms defining a slotted portion, with the slotted portion comprising a channel and a plurality of endpoints, the pair of arms moveable between a first position and a second position, wherein the channel runs the entire length of the pair of arms and each of the plurality of pins of the seat platform is configured to engage the slotted portion, being reversibly held at one of the plurality of endpoints when the pair of arms are in the first position, and move throughout the entire length of the channel when the pair of arms are in the first position, wherein the pair of arms and the seat platform are configured to be stored within the base when the pair of arms are in the second position.

8. The foldable stool of claim 7, wherein each of the pair of arms extends away from the base and is configured to support the occupant in the first position, and each of the pair of arms is generally parallel to the base in the second position.

9. The foldable stool of claim 7, wherein the pair of arms comprises a first arm and a second arm, with the first arm configured to fold on top of the second arm when the pair of arms engage the second position.

10. A foldable stool, comprising:
    a base;
    a seat platform configured to support an occupant, the seat platform comprising a plurality of pins, each of the plurality of pins extending away from the seat platform along a plane parallel to the seat platform, with at least one pin located at each end of the seat platform;
    a pair of arms, moveable between a first position and a second position, coupled to the base; and
    a slotted portion configured to be engaged by each of the plurality of pins, the slotted portion comprising a channel, a first side, a second side and a plurality of endpoints, wherein the channel runs the entire length of the pair of arms and each of the plurality of endpoints is affixed to the first side and the second side of the channel in a pattern, wherein the pattern of the plurality of endpoints is an alternating pattern, with at least one of the plurality of endpoints affixed to the first side of the slotted portion, and at least one of the plurality of endpoints affixed to the second side of the slotted portion, with each of the plurality of pins configured to be reversibly held at each of the plurality of endpoints, and move throughout the entire length of the channel.

11. The foldable stool of claim 10, wherein the pattern of the plurality of endpoints is a first side pattern, with the first of the plurality of endpoints affixed to the first side of the slotted portion.

12. The foldable stool of claim 10, wherein the pattern of the plurality of endpoints is a second side pattern, with the first of the plurality of endpoints affixed to the second side of the slotted portion.

13. The foldable still of claim 10, wherein the pair of arms define a generally C-shaped configuration hingedly attached to the base at a first end and a second end.

14. The foldable stool of claim 13, wherein each of the pair of arms extends away from the base and is configured to support the occupant in the first position, and each of the pair of arms is generally parallel to the base in the second position.

15. The foldable stool of claim 13, wherein the slotted portion is configured to be engaged by the plurality of pins of the seat platform when each of the pair of arms is in the first position.

* * * * *